June 27, 1950  L. SAIVES  2,513,212
APPARATUS FOR THE PREPARATION OF CASTING MOLDS
Filed March 5, 1948
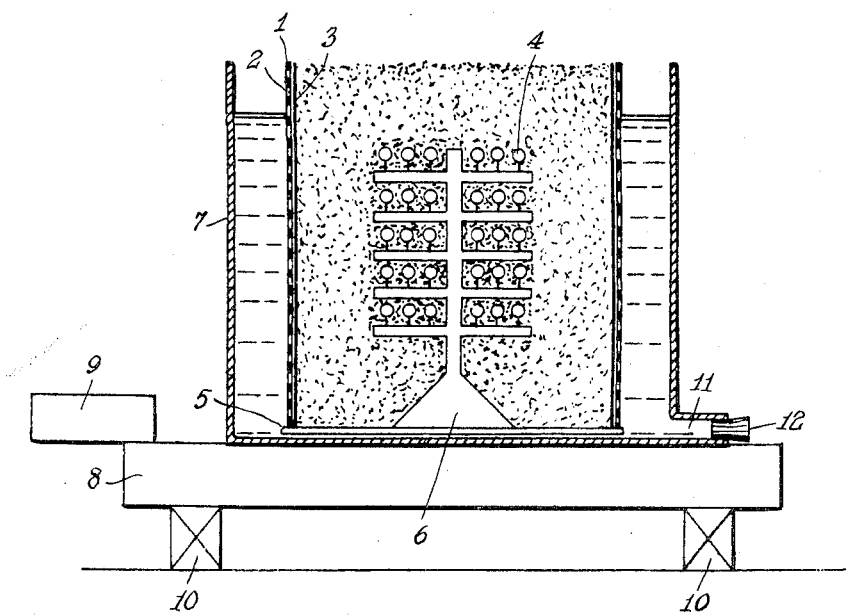
INVENTOR
LEON SAIVES
BY
ATTORNEY Patented June 27, 1950

2,513,212

UNITED STATES PATENT OFFICE 2,513,212

APPARATUS FOR THE PREPARATION OF CASTING MOLDS

Léon Saives, Billancourt, France, assignor to Regie Nationale des Usines Renault, Billancourt, France Application March 5, 1948, Serial No. 13,226
In France March 6, 1947

2 Claims. (Cl. 22—45)

1

It is standard practice to mix sand in the dry state with a hydraulic binder, then to moisten it with water without causing the mixture to become pasty, and then to make casting mold in which the bulk is tamped lightly and requires neither drying nor baking, since the amount of water employed remains lower than that required for the complete hydration of the binder.

This technique is specially suitable for snap-molding, and it allows also for the elimination of molding boxes, but it is not adaptable for precision pouring in the lost-wax process. The snap-molds of sand thus prepared, although movable and plastic, are too hard to be laid against the surfaces of the pattern in wax without the danger of breaking it. Even if a greater amount of water is used the method is not adaptable. If, in fact, the pattern in wax is in the mold box and if the latter is filled with the mixture of sand and cement mixed with water, the product is too pasty to be poured into all the interstitial spaces of the pattern, even if the filling takes place on a shaking-table. If, on the other hand, it is made more fluid by increasing the amount of water, the cement is watered and hydration takes place without setting with the result that the product is not hard enough and there is, moreover a variation in the result depending upon the length of time required for the operation.

The object of the present invention is a method that does away with these drawbacks in a really outstanding way; that is, the filling of even the minutest interstitial spaces is insured and the cement sets, making a completely cohesive whole.

The invention applies likewise to the equipment designed for the adaptation of the method.

The frame of the mold is provided with a wall that lets water go through but holds back the powdered cement. This wall, for instance, may be formed by a metal plate, through which are drilled throughout its surface a large number of evenly-spaced small holes. The inside of this plate is covered with filter paper.

The pattern in wax is joined, for instance, to a base plate of paraffin wax, on which the metal frame rests. The whole thing lies on the bottom of a tank, that, for instance, may be slightly higher than the frame and may be of the same height as the frame. The whole setup is put on a shaking-table.

The method and an example of the equipment for putting it into operation will be given in a more detailed way in the following disclosure, taken with reference to the accompanying drawing, that shows in a somewhat diagrammatic manner the assembly of the various parts employed for the preparation of the mold.

The frame 1 is enclosed by a plate perforated with a large number of small apertures 2, a sheet 3 of filtering material, such as filter paper, is laid against this casing.

Inside the frame is put the pattern in wax that comprises the piece to be modelled or clusters of pieces with the feed ducts and the pouring cone 6. This pattern is supported on the base plate 5 of easily melted paraffin wax by welding the paraffin of the plate with that of the cone.

This whole assembly rests on the bottom of an outside tank 7 slightly larger than the box 1. More particularly it may be of substantially the same height as the frame. The tank and its contents are put on a shaking-table 8 that may be put in motion by any suitable mechanical means, for instance by a pneumatic vibrator shown in a diagrammatic way at 9. This table preferably is laid on rubber pads 10.

The tank is furnished with a drain outlet 11, closed by a plug 12.

The preparation of a mold is carried out in the following way:

After a very thorough mixing of suitable amounts of the dry sand filler with powdered cement, the shaking-table 8 is started up. The mixture of sand and cement, always in a dry and powdered condition, is poured slowly inside the frame 1, until the latter is quite full. The mixture finds its way into the minutest recesses as a result of the vibrating motion imparted to the table 8.

Pure water or water to which has been added a trace of a wetting agent, is, at the same time, poured slowly into the tank 7 outside the frame of the mold box. The water passes into the mold owing to the permeable nature of the frame, passing, for instance, through holes 2 of the plate, the filter paper 3 and is soaked up by the cement and sand. As a result of capillary attraction, the water rises more quickly in the mixture of sand and cement than in the outer tank. The addition of water into the tank is stopped as soon as the mixture of sand and cement in the upper portion of the mold has picked up water, which occurs when the water is a few centimeters below the upper level of the mold. The shaking-table 8 is then shut off.

When this operation is finished the next step is to empty the tank 7, for instance by using a siphon, or better by opening the drainage tap 11. The cement is left to stand long enough for it to set properly. The mold is then unwaxed and dried.

The result of the method is to give a very even consistency to the material filling the mold. As the cement is distributed in a very uniform way, the flow of water in filling and emptying is sufficiently slow that, with due regard to the sealing effect ensuing from the quiet setting of the cement, there may be no noticeable movement of the latter which remains of very even consistency. In this process, the bedding of the cement in too great a bulk of water is avoided; work is carried out with the amount of water required for impregnation and under such conditions; a first class set is obtained.

The sand used for filling is graded to advantage by screening. It may consist of quartz sand, such as sand from Nemours (Seine et Marne), or of a high-temperature form of silica, such as tridymite coming from the calcination of quartz sand between 870 and 1470° C. in the presence of a mineralising agent, or it may be refractory clay coming from firebrick waste, or calcined crushed bauxite, or in short any other product that is satisfactory from the point of view of its being chemically inert with a proper granular condition, coefficient of expansion and refractory properties.

The cement may be of the ordinary aluminous variety, when the refractory properties demanded are not very high as happens in the pouring of copper alloys. Otherwise, aluminous cement may be used that is iron free.

The cement proportion is selected to satisfy conflicting requirements. There must be enough of it to give absolute rigidity and it has to be of sufficient mechanical strength in view of the handling of the molds and more especially for the avoidance of any damage during drying, unwaxing and pouring; it must be small enough in quantity to preserve in the mold a high degree of porosity thereby allowing the quick escape of air while filling is going on without any air-holes being required; and a sufficiently small amount of cement is necessary so that after pouring, the mold may be stripped, that is to say, broken for the removal of the modelled pieces.

With the more usual cements, the content ranges between 4 and 14%, and 7% is quite a satisfactory figure.

The method disclosed offers the following advantages:

Effective filling of all the irregularities of the wax mold;

Very even distribution in the proper proportions of cement and water thereby producing a great uniformity in the properties of the filling material after setting.

Practical combination of the properties of good cohesiveness, porosity and ease of stripping.

The method is applicable to any quality of sand and cement that may possess the right refractory properties.

What I claim is:

1. Apparatus for use in the preparation of molds of the lost wax type, comprising a container for receiving a pattern having a rigid perforated wall and a base plate of a waxlike material supporting said wall, a filter for said wall adjacent thereto, a water receiving vat larger than said container and substantially enclosing same having water drainage means, and means for imparting a vibratory motion to said vat and the container therein.

2. Apparatus according to claim 1, wherein said wall consists of sheet metal.

LÉON SAIVES.

REFERENCES CITED

The following references are of record in the file of this patent:

UNITED STATES PATENTS

| Number | Name | Date |
|---|---|---|
| 200,761 | Reese | Feb. 26, 1878 |
| 764,361 | Jaques | July 5, 1904 |
| 1,244,257 | Sweetnam | Oct. 23, 1917 |
| 1,325,004 | Davidson | Dec. 16, 1919 |
| 1,368,756 | Ross | Feb. 15, 1921 |
| 1,535,017 | Cline | Apr. 21, 1925 |
| 1,690,467 | Weaver | Nov. 6, 1928 |
| 1,752,266 | Sloan | Mar. 25, 1930 |
| 2,065,977 | Jefferies | Dec. 29, 1936 |
| 2,092,106 | Coddington | Sept. 7, 1937 |
| 2,092,832 | Cohn | Sept. 14, 1937 |
| 2,175,895 | Hybinette | Oct. 10, 1939 |
| 2,201,131 | Jungerson | May 14, 1940 |
| 2,256,046 | Dietert | Sept. 16, 1941 |
| 2,313,697 | Juppenlatz | Mar. 9, 1943 |